US012689630B2

(12) United States Patent
Dror et al.

(10) Patent No.: US 12,689,630 B2
(45) Date of Patent: Jul. 21, 2026

(54) METHOD AND SYSTEM FOR SUPPORTING DUAL PARTY CONTROL AUTHORIZATION FOR SENSITIVE OPERATIONS

(71) Applicant: Dell Products L.P., Round Rock, TX (US)

(72) Inventors: Ephraim Dror, Cupertino, CA (US); Senthil Ponnuswamy, San Jose, CA (US); Abhidnya Sushant Joshi, Pune (IN); Satish Inampudi, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 18/651,191

(22) Filed: Apr. 30, 2024

(65) Prior Publication Data

US 2025/0337746 A1      Oct. 30, 2025

(51) Int. Cl.
*H04L 9/40* (2022.01)
*G06F 21/62* (2013.01)

(52) U.S. Cl.
CPC ........ *H04L 63/105* (2013.01); *G06F 21/6218* (2013.01)

(58) Field of Classification Search
CPC ........................... H04L 63/105; G06F 21/6218
See application file for complete search history.

(56) References Cited

U.S. PATENT DOCUMENTS

| | | | | |
|---|---|---|---|---|
| 7,610,614 B1 * | 10/2009 | Frankel | ............... | H04L 63/0442 |
| | | | | 713/182 |
| 11,030,339 B1 * | 6/2021 | Ilincic | ................... | G06F 21/602 |
| 11,144,676 B1 * | 10/2021 | Palmer | ............... | G06F 21/6218 |
| 11,237,921 B2 * | 2/2022 | LeCrone | ............. | G06F 11/1471 |
| 12,463,995 B1 * | 11/2025 | Welsh | ................... | H04L 67/306 |
| 2002/0059512 A1 * | 5/2002 | Desjardins | ............. | G06Q 10/10 |
| | | | | 713/1 |
| 2002/0184119 A1 * | 12/2002 | Gagne | .................. | G06Q 10/087 |
| | | | | 705/29 |
| 2002/0184535 A1 * | 12/2002 | Moaven | .............. | G06F 21/6218 |
| | | | | 726/17 |
| 2003/0076736 A1 * | 4/2003 | Buker | .................. | G05B 19/042 |
| | | | | 366/132 |

(Continued)

*Primary Examiner* — Jason Chiang
(74) *Attorney, Agent, or Firm* — Chamberlain, Hrdlicka, White, Williams & Aughtry; Aly Z. Dossa

(57) ABSTRACT

A method for managing an operation includes: receiving a request from a data protection module with respect to assigning a security officer role (SOR) to a person; in response to the request and at a first point-in-time, initiating assignment of the SOR to the person; receiving, at a second point-in-time, a notification from the data protection module indicating that the SOR is assigned to the person; in response to the notification, sending a second request to the data protection module to execute the operation; after the sending the second request: making a first determination that the second request has not been approved; waiting, based on the first determination, until the second request is approved by the person or a second person assigned the SOR; making a second determination that the second request is approved by the second person; and continuing, based on the second determination, execution of the operation.

17 Claims, 6 Drawing Sheets

US 12,689,630 B2

Page 2

(56) References Cited

U.S. PATENT DOCUMENTS

| | | | | |
|---|---|---|---|---|
| 2003/0177376 A1* | 9/2003 | Arce Velleggia | G06F 21/33 | 713/189 |
| 2003/0229549 A1* | 12/2003 | Wolinsky | G06Q 30/0273 | 705/14.69 |
| 2004/0102922 A1* | 5/2004 | Tracy | G06Q 40/08 | 702/181 |
| 2005/0114243 A1* | 5/2005 | Scumniotales | G06Q 10/10 | 705/35 |
| 2005/0138061 A1* | 6/2005 | Kuehr-McLaren | G06Q 10/10 | 707/999.102 |
| 2006/0031932 A1* | 2/2006 | Vail | G06Q 10/10 | 726/22 |
| 2007/0180491 A1* | 8/2007 | Mevissen | H04L 63/10 | 726/2 |
| 2007/0261103 A1* | 11/2007 | Viavant | G06F 21/40 | 726/2 |
| 2008/0256606 A1* | 10/2008 | Koikara | G06F 21/604 | 726/4 |
| 2009/0031131 A1* | 1/2009 | Qiu | H04L 63/0442 | 713/172 |
| 2010/0114967 A1* | 5/2010 | Yaniv | G06F 16/2365 | 707/783 |
| 2010/0115577 A1* | 5/2010 | Ratnala | G06F 21/604 | 726/1 |
| 2011/0078759 A1* | 3/2011 | Choi | H04L 63/102 | 726/1 |
| 2014/0195390 A1* | 7/2014 | Dema | G06Q 40/12 | 705/30 |
| 2015/0370824 A1* | 12/2015 | Chui | G06F 16/21 | 707/786 |
| 2016/0119357 A1* | 4/2016 | Kinsella | H04L 67/1029 | 726/1 |
| 2016/0132803 A1* | 5/2016 | Iwashita | G06Q 10/06311 | 705/7.13 |
| 2016/0323288 A1* | 11/2016 | Peterson | H04L 63/102 | |
| 2017/0201525 A1* | 7/2017 | Biller | H04L 63/08 | |
| 2018/0217996 A1* | 8/2018 | Joshi | G06F 16/1774 | |
| 2019/0205555 A1* | 7/2019 | Duffy | G06F 21/6218 | |
| 2020/0234242 A1* | 7/2020 | Parks | G06F 8/34 | |
| 2021/0209535 A1* | 7/2021 | Tezak | G06F 3/0481 | |
| 2021/0217106 A1* | 7/2021 | Hauser | G06Q 30/0241 | |
| 2022/0121620 A1* | 4/2022 | Rath | G06F 21/602 | |
| 2022/0174126 A1* | 6/2022 | Nakagawa | H04L 67/54 | |
| 2022/0179976 A1* | 6/2022 | Walters | G06F 21/45 | |
| 2022/0232288 A1* | 7/2022 | Ren | G06Q 50/01 | |
| 2022/0286458 A1* | 9/2022 | O'Connor | H04L 63/102 | |
| 2022/0345457 A1* | 10/2022 | Jeffords | H04L 63/10 | |
| 2022/0417200 A1* | 12/2022 | Brevoort | G06Q 10/0633 | |
| 2023/0087384 A1* | 3/2023 | Matthews | G06Q 20/405 | 711/3 |
| 2023/0168872 A1* | 6/2023 | Hang | G06F 9/44505 | 715/762 |
| 2023/0229792 A1* | 7/2023 | Ponnuswamy | G06F 21/604 | 726/26 |
| 2023/0281249 A1* | 9/2023 | Laliberte | G06F 40/134 | 715/208 |
| 2023/0351007 A1* | 11/2023 | DeGraaf | G06F 21/6218 | |
| 2023/0401337 A1* | 12/2023 | Wu | G06F 21/629 | |
| 2024/0179147 A1* | 5/2024 | Dayan | H04L 63/0815 | |
| 2024/0195692 A1* | 6/2024 | Liew | H04L 41/16 | |
| 2024/0364707 A1* | 10/2024 | Elmenshawy | G06F 8/60 | |
| 2025/0265338 A1* | 8/2025 | Albero | G06F 21/57 | |

* cited by examiner

*Example operations that always require Security Officer (SO) authorization/approval*

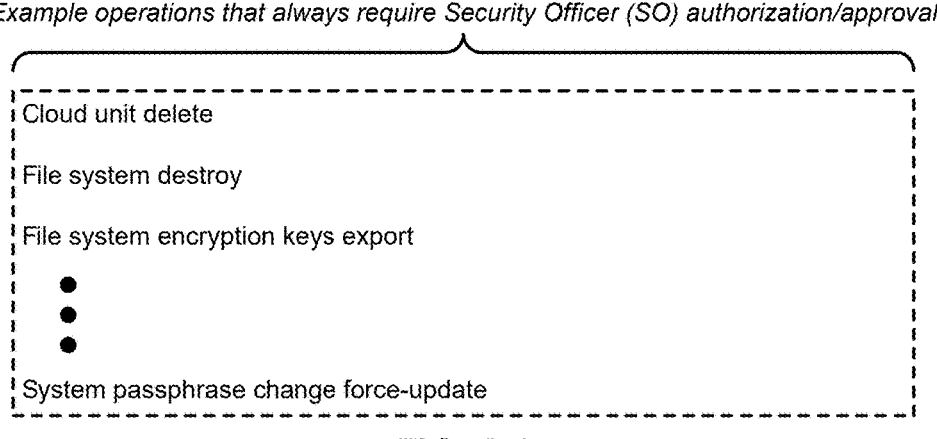

Cloud unit delete

File system destroy

File system encryption keys export

●
●
●

System passphrase change force-update

FIG. 2.1

*Example operations that require SO authorization only when retention-lock compliance (RLC) is enabled*

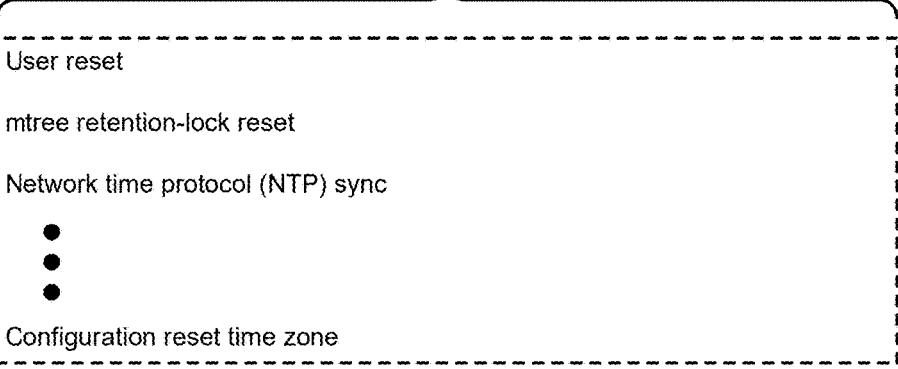

User reset mtree retention-lock reset

Network time protocol (NTP) sync

●
●
●

Configuration reset time zone

FIG. 2.2

*Example operations that require SO authorization if and only if an SO authorization policy is enabled*

Admin access option reset

System bash enter

Admin access option set password-hash

●
●
●

Delete session

FIG. 2.3

METHOD AND SYSTEM FOR SUPPORTING DUAL PARTY CONTROL AUTHORIZATION FOR SENSITIVE OPERATIONS

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 2.1 shows example operations that always require security officer (SO) authorization/approval in accordance with one or more embodiments disclosed herein.

FIG. 2.2 shows example operations that require SO authorization only when retention-lock compliance (RLC) is enabled in accordance with one or more embodiments disclosed herein.

FIG. 2.3 shows example operations that require SO authorization if and only if an SO authorization policy is enabled in accordance with one or more embodiments disclosed herein.

DETAILED DESCRIPTION

Figure 1:
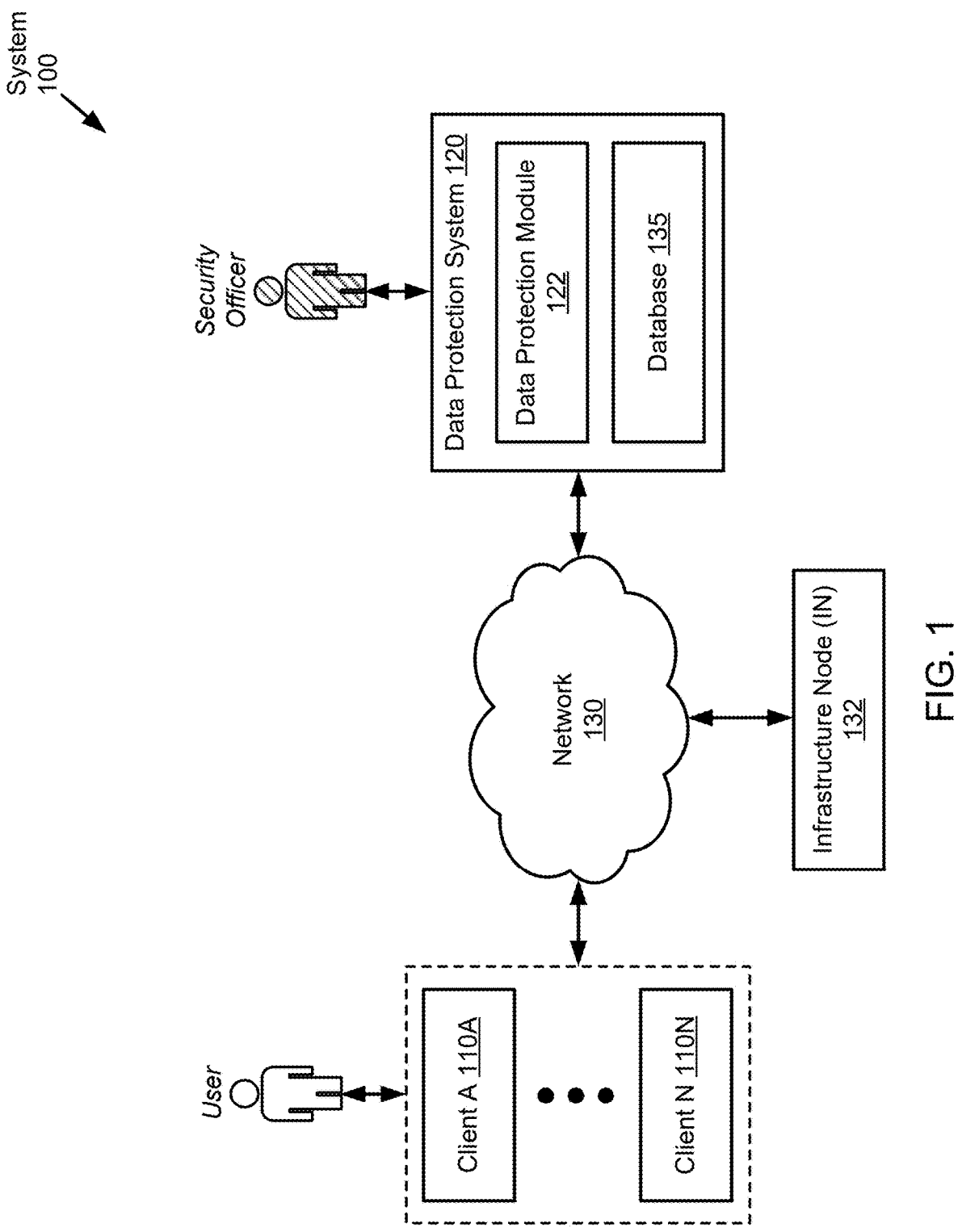
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a data protection system implements a security officer role (SOR), in which a user/person assigned with this role (i.e., the SOR) may have the capability of applying an oversight policy on users (e.g., administrators) operating on a computing device (e.g., a client) that is receiving computer-implemented services from the data protection system. In most cases, the purpose of the SOR is to implement a dual party control over data that is managed by a data protection system. For example, a person assigned with the SOR may manage a sensitive operation (e.g., deleting a file system) that is requested by a user (executing on a client). In this example, as an additional security measure, the person (assigned with the SOR) may not allow the user to perform this operation without providing his/her authorization.

In traditional data protection systems, a person assigned with the SOR must enter his/her credentials (e.g., username, password, etc.) alongside a user who made a request to perform, for example, a sensitive operation. More specifically, the person (assigned with the SOR) has to be physically next to the user in order to approve the user's request. This may cause one or more issues such as, for example, (i) the person's credentials may be compromised (where the user can approve his/her request by himself/herself), (ii) the person must be available when the user needs to perform a sensitive operation, and (iii) if the person is not available (e.g., for the rest of the day), the person may share his/her credentials with the user via electronic mail, in which the person's credentials may be compromised by third-party intruders.

On the other hand, in traditional data protection systems, (i) a person assigned with the SOR is not allowed to remotely authorize a request initiated by a user, (ii) the person is not allowed to preapprove a request (e.g., no preapproval of oversight authorization is possible), (iii) the user is not allowed to automate performing an operation that needs an approval from the person, (iv) the person is only allowed to authorize/oversight management related operations (or control path related operations) (e.g., configuring a corresponding data protection system, monitoring the system, etc.), not data path related operations (e.g., data read/write related operations performed on the system), (v) the person is not allowed to change/modify a predetermined list of operations that needs to be authorized before implementation (said another way, the list of operations is hard coded (e.g., not dynamic) and the person cannot, for example, add more user authorization related commands to the list), and/or (vi) an operation can be authorized by a single person assigned with the SOR (said another way, a user may initiate performing a highly sensitive operation after receiving only one authorization (which, in fact, may cause security issues)).

For at least the reasons discussed above and without requiring resource-intensive efforts (e.g., time, engineering, etc.), a fundamentally different approach/framework is needed (e.g., a framework that provides additional functionalities to a person assigned with the SOR so that the person can manage operations requested by users/customer/administrators in a more effective, secure, and reliable way).

Embodiments disclosed herein relate to methods and systems for managing an operation. As a result of the processes discussed below, one or more embodiments disclosed herein advantageously ensure that: (i) a person assigned with the SOR does not need to be physically next to a user/administrator in order to approve the user's request (e.g., the person can perform his/her oversight activities remotely via a separate login session) (so that (a) compromised credential related security issues can be minimized, (b) the person does not need to be available when the user needs to perform a sensitive operation, and/or (c) the person does not need to share his/her credentials with the user); (ii) stronger separation of duties (between the user and person) is enabled (so that compromised credential related security issues can be minimized); (iii) there is no need for the person to enter his/her credentials on the same login session with the user; (iv) for a better user experience and request management, (a) the person is allowed to approve a request on the spot and/or preapprove the request ahead of time and (b) the user is allowed to automate performing an operation that needs an approval from the person; (v) the person is allowed to authorize/oversight control path related operations and/or data path related operations; (vi) the person is allowed to change/modify a predetermined list of operations that needs to be authorized before implementation (e.g., the person can add more user authorization related commands to the list); (vii) depending on the use case, an operation may require authorization from the person and a second person who is also assigned with the SOR (to minimize possible security issues); and/or (viii) users/customers are enabled to use services provided from different vendors, in which the security officer dual party management feature (provided by the framework) can be used by the customers to oversight sensitive operations performed by those vendors (where (a) the customers are always in the loop with respect to sensitive operations performed by those vendors and (b) those vendors may be assigned with administration rights/capabilities but they are not assigned with security officer rights/privileges).

With respect to (viii), in one or more embodiments, a company (also referred to as a customer entity) may purchase a system from a vendor (i.e., a separate legal entity that is selling the system to the customer). The customer entity may also hire the vendor (or another third party) to manage the system for the customer entity. In this scenario, the security officer may be an individual at the customer entity that must authorize the vendor (or, more specifically, an employee (or an independent contractor) of the vendor that is acting as an administrator of the system) to perform certain sensitive operations on the system. In this manner, while the customer entity outsources the administration of the system to a third party, the customer entity still maintains control of certain sensitive operations on the system.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (INs) (e.g., 132), and a data protection system (120). The system (100) may include additional, fewer, and/or different components without departing from the scope of the embodiments disclosed herein. For example, while shown as including only one IN (e.g., 132), the system (100) may include more INs (e.g., a group of INs including at least fifty INs). Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (132), the network (130), and the data protection system (120) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (132) are shown to be operatively connected through a communication network (e.g., 130), the clients (e.g., 110A, 110N, etc.) and the IN (132) may be directly connected (e.g., without an intervening communication network).

Further, the functioning of the clients (e.g., 110A, 110N, etc.) and the IN (132) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 600, FIG. 6) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (132)) from the users. By doing so, the users may utilize different computing devices (e.g., 600, FIG. 6) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g., (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (132)), store, or otherwise utilize captured sensor data (and/or any other type and/or quantity of data), and/or (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (132). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (132) and/or the data protection system (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g., (i) collecting users' inputs, (ii) correlating collected users' inputs to the computer-implemented services to be provided to the users, (iii) communicating with the IN (132) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (132)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 6:
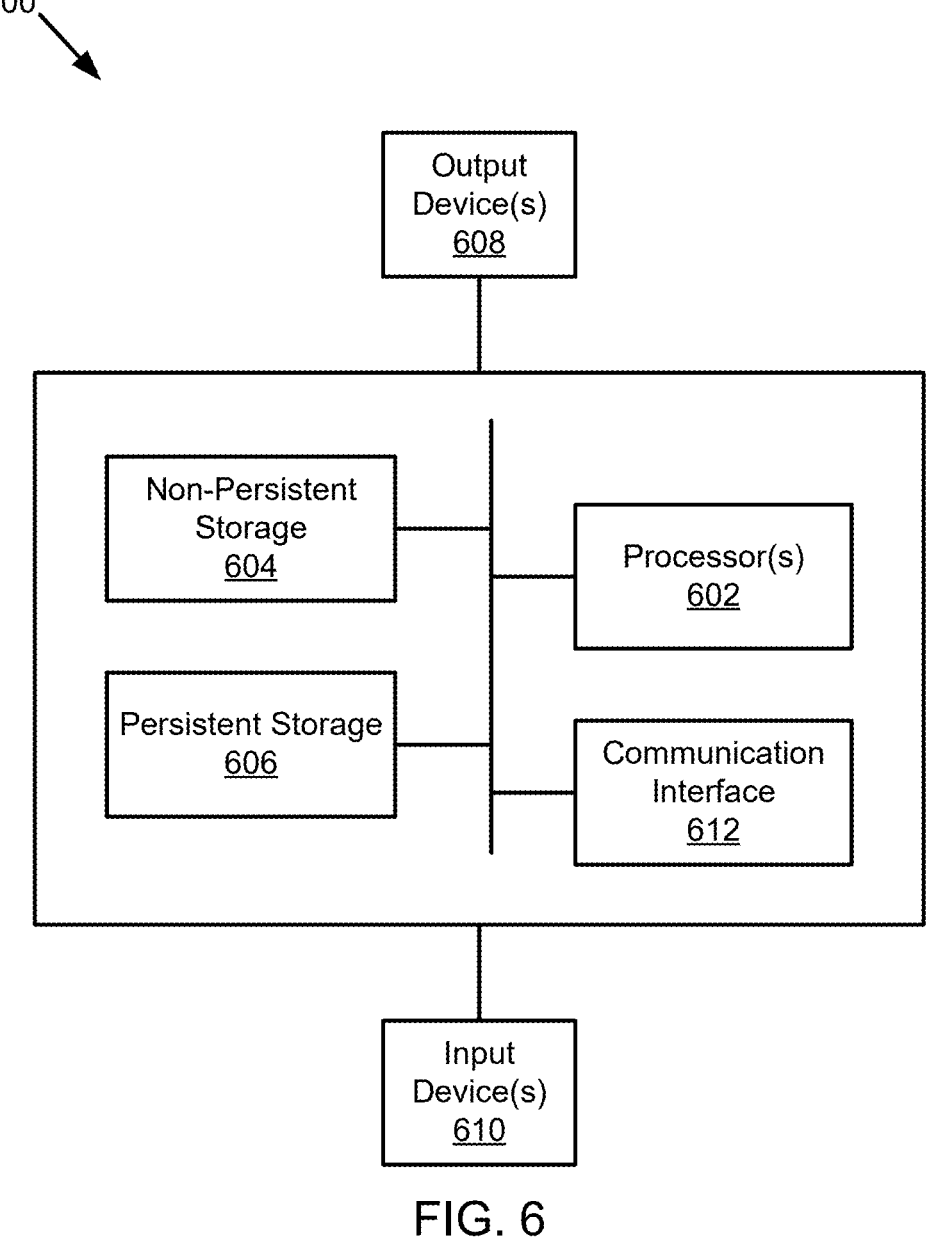
FIG. 6 shows a diagram of a computing device in accordance with one or more embodiments disclosed herein.

Further, in one or more embodiments, a client (e.g., 110A, 110N, etc.) may be implemented as a computing device (e.g., 600, FIG. 6). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, people, etc.) may interact with (or operate) the clients (e.g., 110A, 110N, etc.) in order to perform work-related tasks (e.g., production workloads (e.g., reading data from a table, writing data to the table, etc.)). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (132) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (132) may include functionality to, e.g., (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to a database (135) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features (in conjunction with the data protection module (122)) to the clients and make sure that a minimum level of service is always provided to a user of a client; (ix) transmit the result(s) of the computing work performed (e.g., real-time business insights, equipment maintenance predictions, other actionable responses, etc.) to another IN (not shown) of the system (100) for review and/or other human interactions; (x) exchange data with other devices registered in/to the network (130) in order to, for example, participate in a collaborative workload placement (e.g., the IN may split up a request (e.g., an operation, a task, an activity, etc.) with another IN, coordinating its efforts to complete the request more efficiently than if the IN had been responsible for completing the request); (xi) provide (in conjunction with the data protection module (122)) software-defined data protection for the clients (for example, data generated for the clients may be valuable to the corresponding users, and therefore may be protected by the data protection module); (xii) provide (alternatively or in conjunction with the data protection module (122)) automated data discovery, protection, management, and recovery operations for the clients; (xiii) monitor operational states of the clients; (xiv) regularly back up configuration information of the clients to the database (135); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or to the database; (xvii) provide data deduplication; (xviii) orchestrate data protection through one or more GUIs; (xix) empower (in conjunction with the data protection module (122)) data owners (e.g., users of the clients) to perform self-service data backup and restore operations from their native applications; (xx) ensure compliance and satisfy different types of service level objectives (SLOs) set by an administrator/user; (xxi) increase (in conjunction with the data protection module (122)) resiliency of an organization by enabling rapid recovery or cloud disaster recovery from cyber incidents; (xxii) provide operational simplicity, agility, and flexibility for physical, virtual, and cloud-native environments; (xxiii) consolidate (in conjunction with the data protection module (122)) multiple data process or protection requests (received from, for example, clients) so that duplicative operations (which may not be useful for restoration purposes) are not generated; (xxiv) initiate multiple data process or protection operations in parallel (e.g., the IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (132) may communicate with, for example, the database (135) and/or other storage devices in the system (100).

As described above, the IN (132) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (132) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (132) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (132) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a container or other collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, the term "backup" is intended to be broad in scope. In this manner, example backups (in connection with the embodiments disclosed herein) may include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic, for example, as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window.

Further, while a single IN (e.g., 132) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (132) may provide any quantity and any type of computer-implemented services. To provide computer-implemented services, the IN may be a heterogeneous set, including a collection of physical components/resources configured to perform operations of the IN and/or otherwise execute a collection of logical components/resources of the IN. In one or more embodiments, a resource (e.g., a measurable quantity of a compute-relevant resource type that may be requested, allocated, and/or consumed) may be (or may include), for example (but not limited to): a CPU, a GPU, a DPU, memory, a network resource, storage space (e.g., to store any type and quantity of information), storage input/output, a hardware resource set, a compute resource set (e.g., one or more processors, processor dedicated memory, etc.), a control resource set, etc.

In one or more embodiments, the IN (132) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

In one or more embodiments, resources (or computing resources) of the IN (132) may be divided into three logical resource sets: a compute resource set, a control resource set, and a hardware resource set. Different resource sets, or portions thereof, from the same or different INs may be aggregated (e.g., caused to operate as a computing device) to instantiate a composed IN having at least one resource set from each set of the three resource set model.

In one or more embodiments, a hardware resource set (e.g., of the IN (132)) may include (or specify), for example (but not limited to): a configurable CPU option (e.g., a valid/legitimate vCPU count per-IN option), a minimum user count per-IN, a maximum user count per-IN, a configurable network resource option (e.g., enabling/disabling single-root input/output virtualization (SR-IOV) for specific INs), a configurable memory option (e.g., maximum and minimum memory per-IN), a configurable GPU option (e.g., allowable scheduling policy and/or vGPU count combinations per-IN), a configurable DPU option (e.g., legitimacy of disabling inter-integrated circuit (I2C) for various INs), a configurable storage space option (e.g., a list of disk cloning technologies across all INs), a configurable storage input/output option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a speed select technology configuration (e.g., enabled, disabled, etc.), a virtual NIC (vNIC) count per-IN, a wake on LAN support configuration (e.g., supported/enabled, not supported/disabled, etc.), a swap space configuration per-IN, a reserved memory configuration (e.g., as a percentage of configured memory such as 0-100%), a memory ballooning configuration (e.g., enabled, disabled, etc.), a vGPU count per-IN, a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU), a storage mode configuration (e.g., an enabled high-performance storage array mode, a disabled high-performance storage array mode, an enabled general storage (i.e., co-processor) mode, a disabled general storage mode, etc.), a backup frequency (e.g., hourly, daily, monthly, etc.), etc.

One of ordinary skill will appreciate that the IN (132) may perform other functionalities without departing from the scope of the embodiments disclosed herein.

In one or more embodiments, the IN (132) may be implemented as a physical computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN may also be implemented as a logical device.

In one or more embodiments, the data protection system (120) hosts, at least, the data protection module (122) and the database (135) (which may store data that needs to be protected). The data protection module (122) may be a physical or logical entity, as discussed below.

Referring to FIG. 1, the data protection module (122) may be part of the data protection system (120), may execute as a standalone computing device, or may execute on any of the components of the system (100). For example, the data protection module (122) may be part of the IN (132) or other components of the system (100).

In one or more embodiments, as being a physical computing device or a logical computing device, the data protection module (122) may include functionality to, at least: (i) provide software-defined data protection (e.g., protecting data against loss); (ii) provide automated data discovery, protection, management, and recovery operations (e.g., to reconstruct data following loss) in on-premises; (iii) provide data deduplication; (iv) orchestrate centralized data protection through its GUI (e.g., by its GUI, the module may provide users an item level view of backups); (v) empower data owners to perform self-service data backup and restore operations from their native applications; (vi) ensure compliance and satisfy different types of SLOs; (vii) enable virtualized and cloud deployments, including automated data discovery, protection, management, and recovery operations for in-cloud workloads; (viii) enable data discovery, protection, management, and recovery operations for cloud-native workloads (e.g., an application that was designed to reside in a cloud environment) across multiple cloud environments; (ix) simplify VM image backups of a VM with near-zero impact on the VM; (x) streamline data protection for applications and/or containers (e.g., Kubernetes® containers); (xi) increase resiliency of an organization by enabling rapid recovery or cloud disaster recovery from cyber incidents; (xii) provide long-term data retention (in conjunction with the database (135)); (xiii) provide dynamic NAS backup and recovery; and/or (xiv) provide operational simplicity, agility, and flexibility for physical, virtual, and cloud-native information technology (IT) environments.

One of ordinary skill will appreciate that the data protection module (122) may perform other functionalities without departing from the scope of the embodiments disclosed herein.

In one or more embodiments, the data protection module (122) may provide data protection (e.g., data backup, data management, data restore, etc.) services to a production engine (not shown) of the IN (132) (or any other component of the system (100)). The data protection services may initiate (e.g., instantiate, execute, etc.) generation and storage of backups (e.g., block-based backups, file-based backups (e.g., a file-based backup is a backup of a file system that has been updated, modified, and/or otherwise accessed by the production engine), etc.) in the database (135). The data protection services may also include restoration of the production engine (or any other component of the system (100)) to a restoration host (e.g., a secondary storage system, not shown) using the backups stored (temporarily or permanently) in the database (135) and in accordance with restoration procedures initiated by one or more entities in the system (100).

As being a separate computing device that coordinates backups and restorations (and either includes or communicates with a backup storage (e.g., 135) for storing a completed backup and other data), the data protection module (122) may provide data protection services to the production engine (or any other component of the system (100)) by orchestrating (or scheduling): (i) generation of backups of the production engine (e.g., generation of backups of assets (e.g., files, folders, etc.) associated with the production engine); (ii) storage of the generated backups of the production engine in the database (135); (iii) consolidation of one or more backup requests to reduce (or to prevent) generation of backups that are not useful for restoration purposes; and/or (iv) restoration of the production engine to previous states using backups stored in the database (135). To provide the aforementioned services, the data protection module (122) may include functionality to generate and issue instructions to any other component of the system (100). The data protection module (122) may also generate instructions in response to data protection requests from other entities/devices.

The data protection module (122) may generate such instructions in accordance with backup schedules that specify when backups are to be generated. In one or more embodiments, a backup schedule may lay out specific points in time for a backup process to be performed. Additionally, these backup schedules may be configured based on a user's RPO.

In one or more embodiments, the data protection module (122) may generate and provide to the database (135) backup data, backup metadata, as well as any other data that is produced by the data protection module (122) in the process of performing a backup based on backup policies implemented by the data protection module (122). The backup policies may specify a schedule in which assets associated with the production engine and/or clients (e.g., 110A, 110N, etc.) are to be backed up. The backups may take the form of either a full or incremental backup as well as any other type of backup.

For example, the data protection module (122) may be triggered to generate a backup along with backup metadata and provide the backup and its metadata to the database (135) in response to a backup policy. Alternatively, backup, and backup metadata may be generated by the data protection module (122) and provided to the database (135) in response to a backup request triggered by a client (e.g., 110A) or a user of the client.

As discussed above, the data protection module (122) may restore backup metadata and backup data stored in the database (135). When the data protection module (122) (or other equivalent component of the system (100)) receives a request for a restoration of a backup (e.g., at a later time after performing the backup), the data protection module (122) (or the equivalent component) retrieves the metadata and data stored in the database (135) and restores the data (without reorganizing) to its original location in, for example, the IN (132). Alternatively, in one or more embodiments disclosed herein, the data in the backup may be restored to a file system located in a different IN/host than where it was originally restored as directed by a user, administrator, or other party that requested the restoration. Other methods for restoring the backup may be used and the embodiments disclosed herein are not limited to those described above.

Further, the data protection module (122) includes functionality for generating a file system backup and a file system metadata backup associated with data of a file system (e.g., file system data), in which the file system backup may be generated by copying at least the file system data and storing the copy in the database (135). Similarly, the file system metadata backup may be generated by copying at least the metadata and storing the copy in the database (135), in which the metadata backup may be stored as files that are separate from the file system backup.

In one or more embodiments, the data protection module (122) may obtain a status of a backup (e.g., a block-based backup (BBB)) from the database (135). The status of the BBB may specify information such as: (i) whether the BBB was successful and whether the backup was completed within a BBB window (e.g., 100% of the BBB was completed within the BBB window), or (ii) whether the BBB was unsuccessful and how much of the BBB was not completed within the BBB window (e.g., 70% of the BBB was completed and 30% of the BBB was not completed). In one or more embodiments, the BBB window may be a period of time, with a definite start and end, within which a BBB is set to be completed.

In one or more embodiments, the data protection module (122) may include a backup monitoring service for monitoring a status of a backup (e.g., a BBB). The backup monitoring service may be a computer program that may be executed on the underlying hardware of the data protection module (122). The backup monitoring service may also be designed and configured to facilitate remote access to check the status of and/or manipulate locally stored data during the BBB. Further, the backup monitoring service may include functionality to control remote procedure calls (e.g., application programming interface (API) calls) that access and manipulate any granularity of the locally stored data during the BBB.

As discussed above, the data protection module (122) may be configured to orchestrate a data restoration process (e.g., restoration of the IN (132) to a recovery node using backups stored in the database (135)). For example, when a backup of the IN (132) is completed (at a first point-in-time) and once the production engine is failed, the data protection module (122) may initiate a restoration process (at a second point-in-time, which is later than the first point-in-time) to restore the IN. Based on initiating the data restoration process, a user of Client A (110A) may select one or more assets to restore from the backup of the IN (132) via a GUI. In one or more embodiments, the data protection module (122) or Client A (110A) may provide the GUI to the user.

Continuing with the discussion of the example, once the user has selected the assets via the GUI, the data protection module (122) may make an API call to the database (135) to access the selected assets in the backup. Based on receiving the API call from the data protection module (122), the database (135) may allow the data protection module (122) to access the backup. The data protection module (122) may then read data of the selected assets from the backup. The data protection module (122) may then restore the selected assets to the recovery host in accordance with file system metadata associated with the selected assets.

Further, the data protection module (122) may include functionality to consolidate multiple restore requests (received from a user of a client) to prevent generation of duplicative restorations (e.g., of the IN (132)), in which preventing the generation of duplicative restorations may reduce a restoration window. In one or more embodiments, the restoration window may be a period of time, with a definite start and end, within which an asset restoration is set to be completed. Separately, the data protection module (122) may include functionality to initiate multiple restorations in parallel. For example, the data protection module (122) may host multiple restoration processes. Each of the multiple restoration processes may manage the initiation of a respective restoration. Each of the multiple restoration processes may operate concurrently to initiate multiple restorations.

In one or more embodiments, the data protection system (120) may implement a security officer that is a user/person assigned with the SOR. The person assigned with the SOR, e.g., (i) can have the capability of applying (and/or setting) an oversight policy on users (e.g., administrators) operating on a client (e.g., 110A) that is receiving computer-implemented services from the data protection system (120); (ii) can have the capability of, as an additional security measure, implementing a dual party control over data that is managed by the data protection system (120) (e.g., the person may authorize or may not authorize (via using his/her credentials) a sensitive operation (e.g., deleting a file system) that is requested by the a user); (iii) does not need to be physically next to the user in order to approve the user's request (e.g., the person can perform his/her oversight activities remotely via a separate login session) (so that (a) compromised credential related security issues can be minimized, (b) the person does not need to be available when the user needs to perform a sensitive operation, and/or (c) the person does not need to share his/her credentials with the user); (iv) for a better user experience and request management, is allowed to approve a request on the spot and/or preapprove a request ahead of time; (v) is allowed to authorize/oversight control path related operations and/or data path related operations (on the data protection system (120)); (vi) is allowed to change/modify a predetermined list of operations (see e.g., FIGS. 2.1-2.3) that needs to be authorized before implementation (e.g., the person can add more user authorization related commands to the list); (vii) can act as a main defense mechanism against a rogue user (e.g., a malicious insider, a negligent insider, a credential thief, etc.) that is interacting with the data protection system (120) (in order to protect sensitive data that can be accessed through the system); (viii) can view history of authorizations (e.g., previously authorized operation related requests), for example, via/ from the database (135) in order to manage (e.g., modify/ delete) pending requests that require authorization; (ix) can access/login to the database (135) to review pending operation related requests (or other related activities) and approve/ grant one or more of them as needed; (x) can manage one or more policies and configurations (e.g., simply turning on/off oversight requirement on some of the operations (when necessary)); in conjunction with a user (who wants to (a) put all networking related operations under a security officer oversight and/or (b) put user management related operations under a security officer oversight), customize which additional operations that should be oversighted by a security officer (in addition to a hard coded "operations" list available in the database (135); configure default settings of an authorization policy (e.g., the number of operations that a user is authorized to perform, a period of time that the user is authorized to perform those operations, etc.); etc.); (xi) can manage his/her security officer credentials; (xii) can review which security officers are active (e.g., currently logged into the database (135)) or passive; (xiii) can generate newer operation related requests and preapprove them for the future (so that, for example, when a similar or the same request is received from the user, his/her request can be approved faster for a better user experience; and/or (xiv) can review an activities log (described below) stored in the database (135).

As used herein, (i) a "malicious insider" refers to a user who intentionally hurts the data protection system (120), whether through data theft or by sabotage, (ii) a "negligent insider" refers to a user who unintentionally puts the data protection system's security at risk, and (iii) a "credential thief" refers to an outside infiltrator who accesses the data protection system through, for example, an administrator's account.

In one or more embodiments, at a first point-in-time and when the data protection system (120) is deployed to the system (100) (where the data protection system may recommend generation of a security officer to a user (e.g., a system administrator)), the system administrator of a client (e.g., 110N) may assign the SOR to a person to make that person a security officer (e.g., the first security officer) (said another way, at the first point-in-time, there is no security officer is defined to the data protection system and the user is part of an association of the SOR to the person). Thereafter, at a second point-in-time (which is after the first point-in-time), a second (or another) security officer in the data protection system can only be generated by the first security officer, not by the system administrator.

More specifically, a second (or another) person can be assigned with the SOR only by the first security officer, where the system administrator is not part of associating the second person with the SOR. Additionally, (i) neither of the security officers cannot generate any system administrator (to be hosted by a client), (ii) without depending on when a security officer generated, each security officer has equal privileges and can provide the same functionalities, and (iii) only a local user/person (e.g., a local user that is operating on the data protection system (120)) can be assigned with the SOR (e.g., a user who connects to the data protection system via the lightweight directory access protocol (LDAP) cannot become a security officer (or cannot be assigned with the SOR)).

In one or more embodiments, once a security officer is defined in/to the data protection system (120), the last security officer (which is also defined in/to the data protection system) cannot be deleted/removed. For example, consider a scenario where a first security officer is defined to the data protection system (by a corresponding system administrator), where, afterwards, the first security officer generated a second security officer. In this scenario, the second security officer can delete the first security officer (or dismiss that person from the SOR because the first security officer no longer works at the organization); however, the second officer cannot dismiss himself/herself because an authorization entity needs to exist (in the system (100)) to approve/ disapprove any type of operations requested by the system administrator. Said another way, once a security officer is defined in/to the data protection system (120), the data protection system cannot return its initial condition (e.g., the condition where the data protection system does not host a security officer).

In one or more embodiments, a person assigned with the SOR may start authorizing sensitive/destructive operation requests received from a user (of a client (e.g., 110A)) only after a certain period time is passed (e.g., a cooling period such as two days) for improved security, where, during that period, the person can be verified (because, otherwise, a system administrator may act as a security officer as well and spoof the data protection system (120) by indicating that his/her sensitive operation request is approved by the security officer).

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients, the IN, the data protection module, and the database through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. For example, the database (135) may store data (e.g., backup data; file system metadata; assets; rules and/or procedures for performing backups of the IN (132); etc.). Further, the database (135) may also occupy a portion of a physical storage/memory device or, alternatively, may span across multiple physical storage/memory devices.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (135) may store/record unstructured and/or structured data that may include (or specify), for example (but not limited to): an identifier of a user/customer (e.g., a unique string or combination of bits associated with a particular user); an identifier of a security officer; a request received from a user (or a user's account); a geographic location (e.g., a country) associated with the user; a timestamp showing when a specific request is processed by an application; a port number (e.g., associated with a hardware component of a client (e.g., 110N)); a protocol type associated with a port number; computing resource details (including details of hardware components and/or software components) and IP address details of the IN (132) hosting an application where a specific request is processed; an identifier of an application (e.g., that is deployed by a vendor to the database); information with respect to historical metadata (e.g., system logs, applications logs, telemetry data including past and present device usage of one or more computing devices in the system (100), etc.); computing resource details and an IP address of a client that sent a specific request (e.g., to the IN (132)); one or more points-in-time and/or one or more periods of time associated with a data recovery event; data for execution of applications/services (including IN applications and associated end-points); corpuses of annotated data used to build/generate and train processing classifiers for trained ML models; linear, non-linear, and/or ML model parameters; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on the IN (132); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by the data protection module (122); a size of each of the set of assets protected; a number of each type of a set of data protection policies implemented by a user; configuration information associated with the IN (132) (to manage security, network traffic, network access, or any other function/operation performed by the IN); a job detail of a job (e.g., a data protection job, a data restoration job, a log retention job, etc.) that has been initiated by the IN (132); a type of the job (e.g., a non-parallel processing job, a parallel processing job, an analytics job, etc.); information associated with a hardware resource set (discussed above) of the IN (132); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); information regarding an administrator (e.g., a high priority trusted administrator, a low priority trusted administrator, etc.) related to an analytics job; a workflow (e.g., a policy that dictates how a workload should be configured and/or protected, such as an SQL workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; a cumulative history of approved/disapproved operation related requests (including preapproved requests) obtained over a prolonged period of time; an activities log; an authorization/permission record (which is managed by one or more security officers) specifying which user is approved to perform which operation (e.g., User A is approved to perform "cloud unit delete" operation, via a GUI, between 20:00 and 21:00 today); a dynamic list of operations (see FIGS. 2.1-2.3); one or more pending operation related request that are waiting a security officer approval/disapproval; etc.

In one or more embodiments, the activities log may specify (or include), for example (but not limited to): an identifier of a security officer who approved/disapproved an operation related request; an IP address of a computing device that is used by the security officer to approve/disapprove the request; an identifier of a user who sent the request; a type of an interface (e.g., a GUI, a command line interface (CLI), etc.) that is used by the user while sending the request; an IP address of a client that is used by the user to send the request; a timestamp showing when the request is approved/disapproved by the security officer; a reasoning of the security officer about approving/disapproving the request; etc.

In one or more embodiments, comparing to a person assigned with the SOR (which has a full access to the database (135)), a user (e.g., a system administrator) may have a limited access to the database (135). For example, a user cannot access to the database to check which operation related requests are approved, whereas a person assigned with the SOR can access to the database and check approved/disapproved requests.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database, (135) any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer system logs are received, a state of the IN (132) is changed, etc.

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

While FIG. 1 shows a configuration of components, other system configurations may be used without departing from the scope of the embodiments disclosed herein.

Turning now to FIG. 2.1, FIG. 2.1 shows example operations that always require security officer authorization/approval in accordance with one or more embodiments disclosed herein.

Referring to FIG. 2.1, as being part of the dynamic list of operations (see FIG. 1), these operations (e.g., sensitive and destructive operations) may be (or include), for example (but not limited to): cloud unit delete, file system destroy/delete, file system encryption key export, file system encryption disable, file system encryption key-manager reset, system passphrase change force-update, system passphrase option reset store-on-disk, system sanitize, system set date-change-limit, system set date-change-frequency, change network time protocol configuration on a retention-lock compliance (RLC) enabled system, etc.

Turning now to FIG. 2.2, FIG. 2.2 shows example operations that require security officer authorization/approval when the RLC is enabled in accordance with one or more embodiments disclosed herein.

Referring to FIG. 2.2, as being part of the dynamic list of operations (see FIG. 1), these operations may be (or include), for example (but not limited to): user reset, mtree retention-lock reset, network time protocol synchronize, configuration reset time zone, system set date, mtree retention-lock enable, license reset, network time protocol reset, network time protocol enable, network time protocol disable, etc.

Turning now to FIG. 2.3, FIG. 2.3 shows example operations that require security officer authorization/approval if and only if a security officer policy is enabled in accordance with one or more embodiments disclosed herein.

Referring to FIG. 2.3, as being part of the dynamic list of operations (see FIG. 1), these operations may be (or include), for example (but not limited to): system bash enter, administrator access option reset, administrator access option set password-hash, delete session, administrator access option reset, etc.

Figure 3:
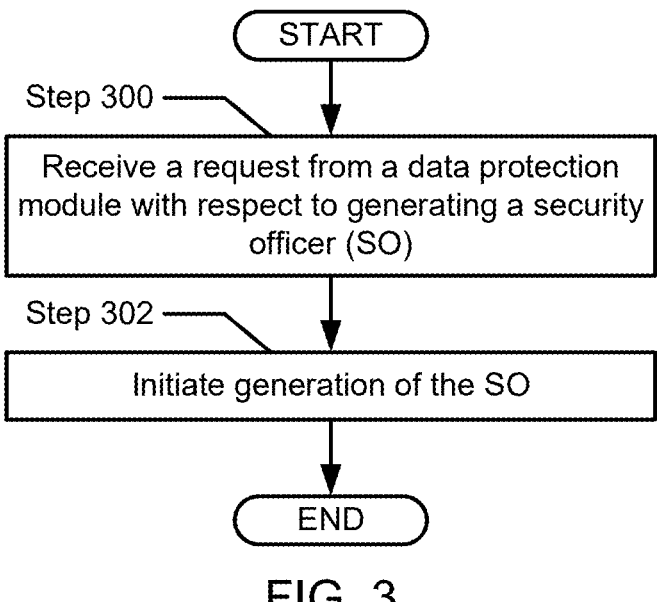
FIG. 3 shows a method for managing users in accordance with one or more embodiments disclosed herein.

FIG. 3 shows a method for managing users (e.g., how to designate a person with the SOR, establishing the separation among users with respect to duties and the SOR, etc.) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3, the method shown in FIG. 3 may be executed by, for example, an engine executing on the client. Other components of the system (100) illustrated in FIG. 1 may also execute all or part of the method shown in FIG. 3 without departing from the scope of the embodiments disclosed herein.

In Step 300, the engine receives a request from a requesting entity (e.g., the data protection module (e.g., 122, FIG. 1)) with respect to generating a security officer (or defining a person with the SOR in/to the data protection system (e.g., 120, FIG. 1)). As discussed above in reference to FIG. 1, the SOR is a role that allows the person (with this role) to oversight, at least, sensitive and/or destructive operations by forming a dual party control mechanism (where more than one user may be involved in authorizing an operation or an operation related request).

In Step 302, in response to receiving the request, as part of that request, and/or in any other manner, the engine invokes the data protection module to communicate with the data protection module. After receiving the data protection module's confirmation, the engine (more specifically, a user of the client) initiates generation of the security officer.

In one or more embodiments, the method may end following Step 302.

Figure 4:
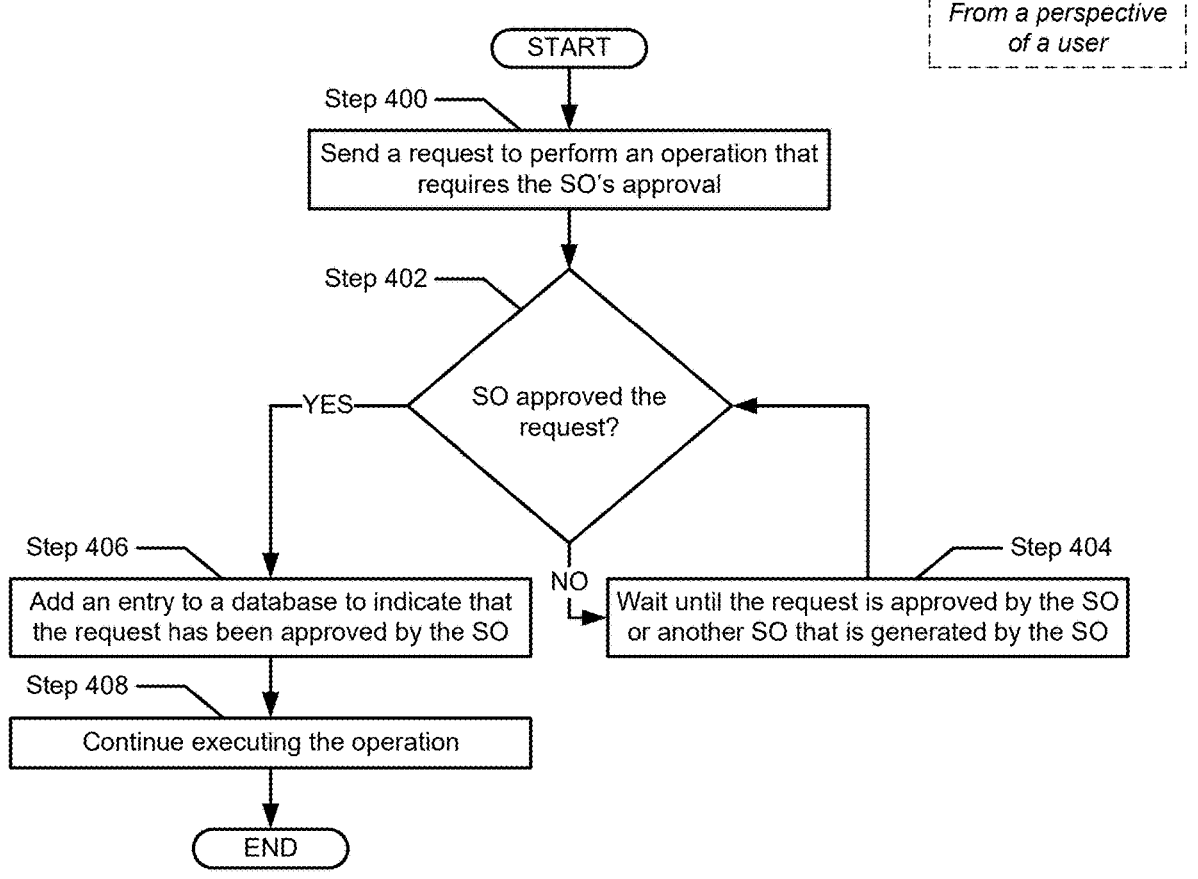
FIG. 4 shows a method for managing an operation from a perspective of a user in accordance with one or more embodiments disclosed herein.

FIG. 4 shows a method for managing an operation from a perspective of a user (e.g., a system administrator of a client (e.g., 110A, FIG. 1)) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4, the method shown in FIG. 4 may be executed by, for example, the engine executing on the client. Other components of the system (100) illustrated in FIG. 1 may also execute all or part of the method shown in FIG. 4 without departing from the scope of the embodiments disclosed herein.

In Step 400, after the security officer has been generated (for example, after a corresponding cooling period is passed, see FIG. 1), the user (via the engine and a GUI/CLI of the client) sends a request (e.g., an operation related request) to the data protection module to perform an operation that requires the security officer's approval. For example, the operation may be one of the operations that always require security officer approval (see FIG. 2.1). In one or more embodiment, the user may be allowed to send the operation related request only once.

In Step 402, based on Step 400, the engine makes a determination (in real-time or near real-time) as to whether a security officer (e.g., the security officer that is generated in Step 302 of FIG. 3 or another security officer that is generated by the security officer) approved the request. Accordingly, in one or more embodiments, if the result of the determination is NO (where an error message is sent to the user), the method proceeds to Step 404. If the result of the determination is YES (where the user may be approved to perform the operation for a period of time), the method alternatively proceeds to Step 406.

In one or more embodiments, the error message may specify (or include), for example (but not limited to): a type of the operation, a portion of a user oversight/authorization policy (that is defined by one of the security officers) that is associated with the operation, etc. Further, the user authorization policy may specify (or include), for example (but not limited to): a number of operations that the user is authorized to perform, a period of time that the user is authorized to perform those operations, etc.

In Step 404, as a result of the determination in Step 402 being NO, the user may wait until the request (sent in Step 400) is approved/granted by the security officer or another security officer that is generated by the security officer, where the method returns to Step 402. While waiting, depending on the user's preference, the user may send a notification (via the engine and GUI of the client) to one or more security officers to indicate that he/she is waiting for a security officer's approval to perform the operation.

Additionally, as a result of the determination in Step 402 being NO and depending on the user's preference, the user may cancel the request (e.g., because of time constraints). If this is the case, the method may end following Step 404.

In Step 406, as a result of the determination in Step 402 being YES, the engine records an entry in a database (e.g., 135, FIG. 1) to indicate that, at least, the request has been approved by the security officer. In Step 408, the engine may continue executing the operation, for example, for a period of time (determined by the security officer (e.g., the period of time may be determined based on the user authorization policy)).

In one or more embodiments, the method may end following Step 408.

Figure 5:
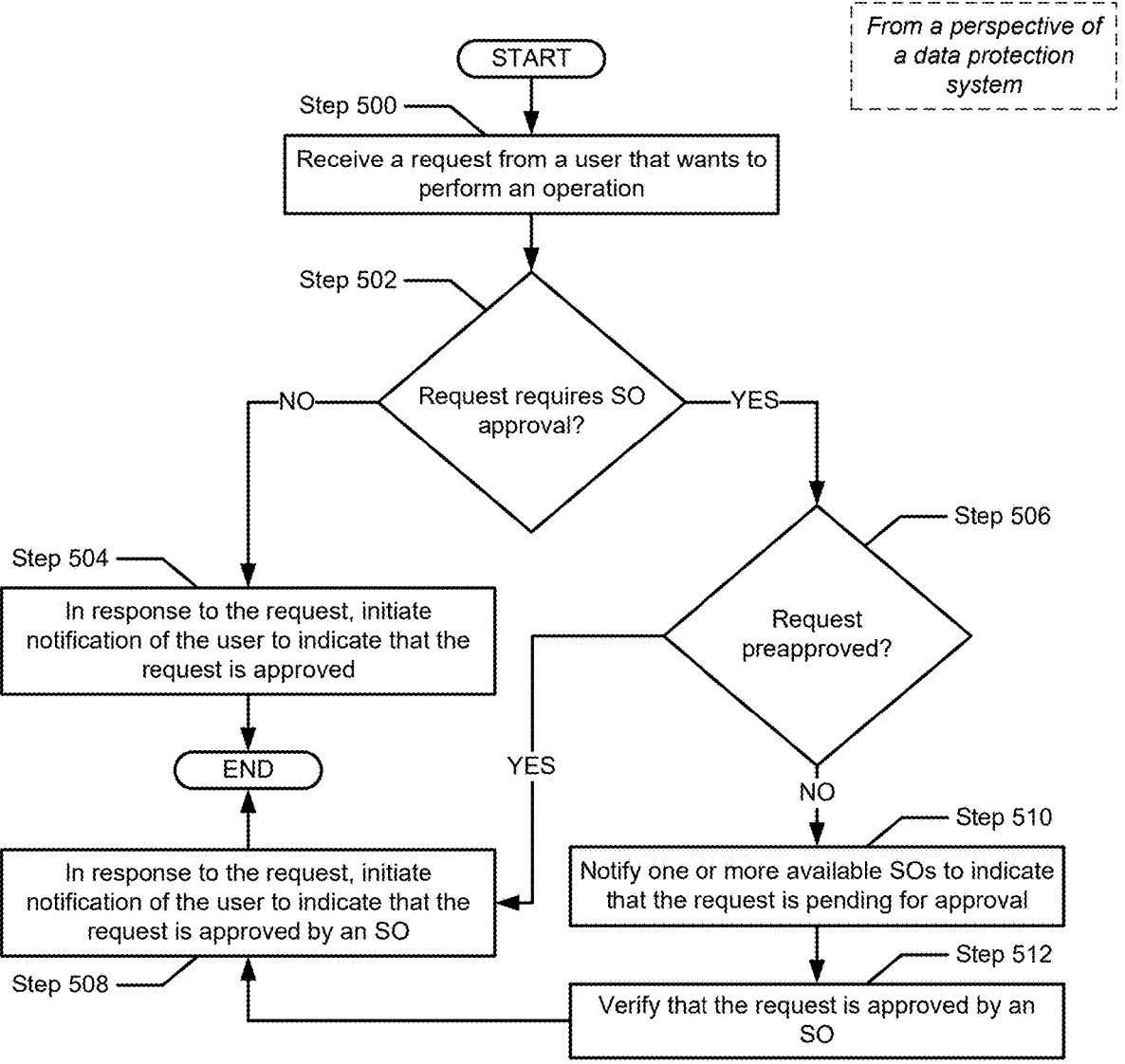
FIG. 5 shows a method for managing the operation from a perspective of a data protection system in accordance with one or more embodiments disclosed herein.

FIG. 5 shows a method for managing the operation from a perspective of a data protection system in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 5, the method shown in FIG. 5 may be executed by, for example, the data protection module. Other components of the system (100) illustrated in FIG. 1 may also execute all or part of the method shown in FIG. 5 without departing from the scope of the embodiments disclosed herein.

In Step 500, the data protection module receives a request (e.g., an operation related request) from a requesting entity (e.g., the user via the GUI and/or the engine, the user via a terminal, etc.) that wants to perform the operation.

In Step 502, in response to receiving the request, as part of that request, and/or in any other manner, the data protection module makes a first determination (in real-time or near real-time) as to whether the request requires a security officer approval. Accordingly, in one or more embodiments, if the result of the first determination is NO, the method proceeds to Step 504. If the result of the first determination is YES, the method alternatively proceeds to Step 506.

In Step 504, as a result of the first determination in Step 502 being NO and in response to the request (received in Step 500), the data protection module initiates notification of the user, via the GUI of the client, to indicate that the request is approved.

In one or more embodiments, the method may end following Step 504.

In Step 506, as a result of the first determination in Step 502 being YES, the data protection module makes a second determination (in real-time or near real-time) as to whether the request is a preapproved request (e.g., by communicating with the database) to check a list of preapproved requests and infer if executing of the operation is approved for the user). Accordingly, in one or more embodiments, if the result of the second determination is NO, the method proceeds to Step 510. If the result of the second determination is YES, the method alternatively proceeds to Step 508.

In Step 508, as a result of the second determination in Step 506 being YES and in response to the request (received in Step 500), the data protection module initiates notification of the user, via the GUI of the client, to indicate that the request is approved (by the security officer or another security officer).

In one or more embodiments, the method may end following Step 508.

In Step 510, as a result of the second determination in Step 506 being NO, the data protection module notifies one or more security officers (including the security officer), e.g., by sending a prompt to their corresponding terminals, to indicate that the request (received in Step 500) is pending for approval (for example, in the database). In one or more embodiments, for example, upon receiving the notification, the security officer may approve the request from his/her own terminal/session (e.g., after starting an SSH session on his/her client), without being physically next to the user (e.g., via a remote session).

In Step 512, based on Step 510, the data protection module verifies that the request is approved by a security officer (e.g., the security officer). Based on that, the method proceeds to Step 508.

Turning now to FIG. 6, FIG. 6 shows a diagram of a computing device in accordance with one or more embodiments disclosed herein.

In one or more embodiments disclosed herein, the computing device (600) may include one or more computer processors (602), non-persistent storage (604) (e.g., volatile memory, such as RAM, cache memory), persistent storage (606) (e.g., a non-transitory computer readable medium, a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing an operation, the method comprising:

receiving a request from a data protection module with respect to assigning a security officer role (SOR) to a person;

in response to the request and at a first point-in-time, initiating assignment of the SOR to the person;

receiving, at a second point-in-time, a notification from the data protection module indicating that the SOR is assigned to the person, wherein the second point-in-time is after the first point-in-time;

after receiving the notification, sending a second request to the data protection module to execute the operation, wherein the operation requires a dual party control mechanism, wherein the operation requires using physical and logical resources of a computing device, wherein the operation requiring a dual party control mechanism is determined by the SOR, wherein the operation requires an approval from the person or a second person assigned the SOR, wherein a retention-lock compliance (RLC) is enabled for the operation, and wherein the operation is synchronizing a network time protocol;

after the sending the second request:

making a first determination that the second request has not been approved;

waiting, based on the first determination, until the second request is approved by the person or the second person assigned the SOR;

making a second determination that the second request is approved by the second person; and continuing, based on the second determination, execution of the operation.

2. The method of claim 1, wherein the operation always requires an approval from the person or the second person, wherein the operation is deleting a file system.

3. The method of claim 1, wherein the second request is initiated by a user, wherein the user is part of the association of the SOR to the person, wherein the user is not part of associating the second person with the SOR, and wherein the person assigns the SOR to the second person.

4. The method of claim 3, wherein the second person does not need to be physically next to the user in order to approve the second request, wherein the second person uses a different login session than a login session of the user.

5. The method of claim 1, wherein the second request is initiated by a user, wherein the second request is to execute the operation on a system, wherein the system is provided by a vendor to a customer entity, wherein the user is an administrator of the system, is associated with the vendor, and is not associated with the customer entity, and wherein the person or the second person is associated with the customer entity.

6. The method of claim 1, wherein the second request is approved by the second person for a period of time, wherein the period of time is determined based on a user oversight policy set by the second person.

7. The method of claim 6, wherein based on the first determination, an error message is displayed to a user, wherein the error message specifies a type of the operation and at least a portion of the user oversight policy that is associated with the operation.

8. A method for managing an operation, the method comprising:

receiving a request from a user that wants to perform an operation;

in response to the request, making a first determination that the request requires a person's approval, wherein the person is assigned with a security officer role (SOR), wherein the operation requires a dual party control mechanism, wherein the operation requires using physical and logical resources of a computing device, wherein the operation requiring a dual party control mechanism is determined by the SOR, wherein the operation requires an approval from the person or a second person assigned the SOR, wherein a retention-lock compliance (RLC) is enabled for the operation, and wherein the operation is synchronizing a network time protocol;

making, based on the first determination, a second determination that the request is not a preapproved request;

notifying, in response to the second determination, the person and the second person assigned the SOR to indicate that the request is pending for approval;

verifying that the request has been approved by the second person; and in response to the verifying, initiating notification of the user to indicate that the request is approved by the second person.

9. The method of claim 8, wherein the second determination is made based on a plurality of preapproved requests recorded in a database, wherein the user has a limited access to the database, wherein each of the person and the second person has a full access to the database.

10. The method of claim 8, wherein the operation always requires an approval from the person or the second person, wherein the operation is deleting a file system.

11. The method of claim 8, wherein the person is assigned the SOR before the second person is assigned the SOR, wherein the user assigns the SOR to the person, and wherein the person assigns the SOR to the second person.

12. The method of claim 8, wherein the second person does not need to be physically next to the user in order to approve the request.

13. The method of claim 12, wherein the user is allowed to send the request only once.

14. A method for managing an operation, the method comprising:

receiving a request from a user that wants to perform an operation;

in response to the request, making a first determination that the request requires an approval of a person assigned a security officer role (SOR), wherein the operation requires a dual party control mechanism, wherein the operation requires using physical and logical resources of a computing device, wherein the operation requiring a dual party control mechanism is determined by the SOR, wherein the operation requires an approval from the person or a second person assigned the SOR, wherein a retention-lock compliance (RLC) is enabled for the operation, and wherein the operation is synchronizing a network time protocol;

making, based on the first determination, a second determination that the request is a preapproved request; and initiating, based on the second determination, notification of the user to indicate that the request is approved by the person.

15. The method of claim 14, wherein the second determination is made based on a plurality of preapproved requests recorded in a database, wherein the user has a limited access to the database, wherein the person has a full access to the database.

16. The method of claim 14, wherein the operation always requires an approval from the person or a second person assigned the SOR, wherein the operation is destroying a file system.

17. The method of claim 14, wherein the person is assigned the SOR before the second person is assigned the SOR, wherein the user initiated the assignment of the SOR to the person, and wherein the person assigns the SOR to the second person.

* * * * *